(12) United States Patent
Okuyama et al.

(10) Patent No.: US 8,183,778 B2
(45) Date of Patent: May 22, 2012

(54) STOICHIOMETRIC PHOSPHOR, AND LIGHT EMITTING DEVICE AND PLASMA DISPLAY PANEL UTILIZING THE PHOSPHOR

(75) Inventors: Kojiro Okuyama, Nara (JP); Yayoi Okui, Osaka (JP); Seigo Shiraishi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/992,017

(22) PCT Filed: Apr. 9, 2010

(86) PCT No.: PCT/JP2010/002622
§ 371 (c)(1),
(2), (4) Date: Nov. 10, 2010

(87) PCT Pub. No.: WO2010/119655
PCT Pub. Date: Oct. 21, 2010

(65) Prior Publication Data
US 2011/0068680 A1      Mar. 24, 2011

(30) Foreign Application Priority Data

Apr. 17, 2009   (JP) ................................. 2009-101108

(51) Int. Cl.
*H01J 1/62* (2006.01)
*C09K 11/77* (2006.01)

(52) U.S. Cl. ................. 313/587; 313/586; 252/301.4 F; 252/301.4 R; 445/25

(58) Field of Classification Search .......... 313/581–587; 315/169.1, 169.4; 345/47, 41, 60, 71; 252/301.4 R, 252/301.4 F
See application file for complete search history.

(56) References Cited

U.S. PATENT DOCUMENTS

| | | | |
|---|---|---|---|
| 6,290,875 | B1 | 9/2001 | Oshio et al. |
| 6,596,195 | B2 | 7/2003 | Srivastava et al. |
| 6,960,878 | B2 | 11/2005 | Sakano et al. |
| 2006/0152135 | A1 | 7/2006 | Choi et al. |
| 2009/0009059 | A1 | 1/2009 | Kwon et al. |
| 2009/0189507 | A1 | 7/2009 | Winkler et al. |
| 2010/0084962 | A1 | 4/2010 | Winkler et al. |

FOREIGN PATENT DOCUMENTS

| | | |
|---|---|---|
| JP | 4-248895 | 9/1992 |
| JP | 2000-297280 | 10/2000 |
| JP | 2003-179269 | 6/2003 |
| JP | 2004-529252 | 9/2004 |
| JP | 2006-193712 | 7/2006 |
| JP | 2009-13412 | 1/2009 |
| WO | 2007/109084 | 9/2007 |
| WO | 2007/144060 | 12/2007 |
| WO | 2008/107062 | 9/2008 |

OTHER PUBLICATIONS

Wu, et al., "Preparation of YAG:Ce spheroidal phase-pure particles by solvo-thermal method and their photoluminescence", Journal of Alloys and Compounds, vol. 468, pp. 571-574, 2009.
Isobe, "Development and Prospect of doped inorganic nanophosphors", Jasco Report, vol. 51, No. 1, pp. 19-24, 2009.

*Primary Examiner* — Tracie Y Green
(74) *Attorney, Agent, or Firm* — Hamre, Schumann, Mueller & Larson, P.C.

(57) ABSTRACT

The present invention provides a phosphor with high luminance and color purity. The phosphor of the present invention is represented by the general formula: $aYO_{3/2} \cdot (3-a)CeO_{3/2} \cdot bAlO_{3/2} \cdot cGaO_{3/2}$, where $2.80 \leq a \leq 2.99$, $1.00 \leq b \leq 5.00$, $0 \leq c \leq 4.00$, and $4.00 \leq b+c \leq 5.00$ are satisfied. In the phosphor, a peak whose peak top is located in the range of diffraction angle $2\theta$ of not less than 16.7 degrees but not more than 16.9 degrees is present in an X-ray diffraction pattern obtained by measurement on the phosphor using an X-ray with a wavelength of 0.774 Å.

5 Claims, 3 Drawing Sheets

STOICHIOMETRIC PHOSPHOR, AND LIGHT EMITTING DEVICE AND PLASMA DISPLAY PANEL UTILIZING THE PHOSPHOR

TECHNICAL FIELD

The present invention relates to a phosphor that is used in a plasma display panel (PDP), a mercury free fluorescent lamp, or the like, and to a light emitting device (particularly, PDP).

BACKGROUND ART

Aluminate phosphors have been put to practical use as phosphors for energy-saving fluorescent lamps. As a blue phosphor, for example, $BaMgAl_{10}O_{17}:Eu$ is mentioned. As a green phosphor, for example, $CeMgAl_{11}O_{19}:Tb$, $BaMgAl_{10}O_{17}:Eu$, Mn, and the like are mentioned.

In recent years, various aluminate phosphors have been put to practical use also as phosphors for PDP. For example, $BaMgAl_{10}O_{17}:Eu$ is used as a blue phosphor, and $(Y,Gd)Al_3B_4O_{12}:Tb$ is used as a green phosphor in the form of a mixture with $Zn_2SiO_4:Mn$.

However, the use of $Zn_2SiO_4:Mn$ or a mixture of $Zn_2SiO_4:Mn$ with $(Y,Gd)Al_3B_4O_{12}:Tb$ as a green phosphor leads to long persistence time, which deteriorates the motion image characteristics as a PDP. Hence, for PDP applications, there is a strong demand for a green phosphor that has short persistence time.

In response to this demand, a method (e.g., Patent Literatures 1 and 2) of using $Y_3Al_5O_{12}:Ce$ as a green phosphor has been proposed.

Citation List
Patent Literature
Patent Literature 1: JP 2006-193712 A
Patent Literature 2: JP 2009-13412 A

SUMMARY OF INVENTION

Technical Problem

However, according to the above-mentioned conventional methods, the luminance decreases, though the persistence time of the green phosphor can be shortened. Further, it is required to improve the color purity because the color purity of $Y_3Al_5O_{12}:Ce$ is poor, compared to that of $Zn_2SiO_4:Mn$, or $(Y,Gd)Al_3B_4O_{12}:Tb$.

The present invention has achieved a solution to the above-mentioned conventional problems, and it is an object of the present invention to provide a phosphor with high luminance and color purity. It is a further object of the present invention to provide a light emitting device, particularly PDP, with high efficiency that uses the above phosphor.

Solution to Problem

The phosphor of the present invention that has solved the above-described problems is a phosphor represented by the general formula: $aYO_{3/2} \cdot (3-a)CeO_{3/2} \cdot bAlO_{3/2} \cdot cGaO_{3/2}$, where $2.80 \leq a \leq 2.99$, $1.00 \leq b \leq 5.00$, $0 \leq c \leq 4.00$, and $4.00 \leq b+c \leq 5.00$ are satisfied. In the phosphor, a peak whose peak top is located in the range of diffraction angle $2\theta$ of not less than 16.7 degrees but not more than 16.9 degrees is present in an X-ray diffraction pattern obtained by measurement on the phosphor using an X-ray with a wavelength of 0.774 Å. In the above-mentioned general formula, $2.97 \leq a \leq 2.99$ is preferably satisfied.

Moreover, the light emitting device of the present invention is a light emitting device including a phosphor layer that contains the above phosphor. The above-mentioned light emitting device is preferably a plasma display panel.

The plasma display panel preferably includes: a front panel; a back panel that is arranged to face the front panel; barrier ribs that define a clearance between the front panel and the back panel; a pair of electrodes that are disposed on the back panel or the front panel; an external circuit that is connected to the electrodes; a discharge gas that is present at least between the electrodes and contains xenon that generates a vacuum ultraviolet ray by applying a voltage between the electrodes through the external circuit; and phosphor layers that emit visible light induced by the vacuum ultraviolet ray. The phosphor layers include a green phosphor layer, and the green phosphor layer contains the above phosphor.

Advantageous Effects of Invention

The present invention can provide a phosphor with high luminance and color purity. The present invention also can provide a light emitting device (particularly PDP) with high efficiency.

DESCRIPTION OF EMBODIMENTS

Figure 1:
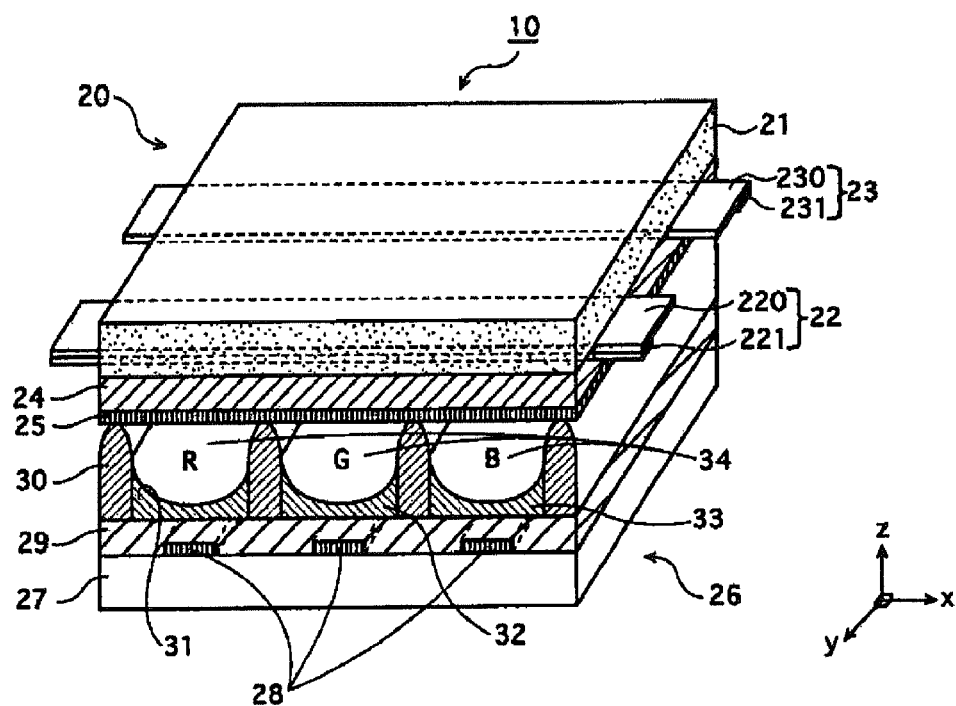
FIG. 1 is a schematic cross-sectional view showing a structure of a PDP of the present invention.

Hereinafter, embodiments of the present invention will be described in detail.

<Composition of Phosphor>

The phosphor of the present invention is represented by the general formula: $aYO_{3/2} \cdot (3-a)CeO_{3/2} \cdot bAlO_{3/2} \cdot TGaO_{3/2}$, where $2.80 \leq a \leq 2.99$, $1.00 \leq b \leq 5.00$, $0 \leq c \leq 4.00$, and $4.00 \leq b+c \leq 5.00$ are satisfied. With regard to coefficient a, a preferable range is $2.97 \leq a \leq 2.99$ in view of luminance.

<Characteristics Relating to X-ray Diffraction of Phosphor>

The phosphor of the present invention is characterized in that a peak whose peak top is located in the range of diffraction angle $2\theta$ of not less than 16.7 degrees but not more than 16.9 degrees is present in an X-ray diffraction pattern obtained by measurement on the phosphor using an X-ray with a wavelength of 0.774 Å.

The inventors have found from their extensive experimental studies that a phosphor having the above composition and satisfying the above characteristics relating to the X-ray diffraction pattern can be a phosphor with high luminance and color purity. With respect to the conventional $Y_3Al_5O_{12}:Ce$ phosphor, no peak is present in the above range of diffraction angle $2\theta$. The reason why the phosphor satisfying the above characteristics relating to the X-ray diffraction pattern has excellent light-emitting property is not clear, but it is presumed as follows. In the experiments conducted by the present inventors, a phosphor was produced under unique conditions as described later. It is considered that the production under the different conditions causes a change of the lattice constant of the phosphor, which results in an improvement in the light-emitting property of the phosphor.

In the present invention, in order to distinguish a peak from a change in signal intensity due to noise and the like in the X-ray diffraction pattern, among the changes in signal intensity, a change in signal intensity having an intensity of at least one hundredth of a peak present in the vicinity of a diffraction angle 2θ=16.6 degrees is recognized as a peak. In the present invention, the phrase "a peak is present" refers to the case where the sign of the differential value at each angle point constituting the spectrum changes from positive to negative within a predetermined range of diffraction angle, while ignoring noise.

<Powder X-ray Diffraction Measurement>

Next, a powder X-ray diffraction measurement on the phosphor of the present invention will be described.

For the powder X-ray diffraction measurement, for example, BL19B2 powder X-ray diffraction equipment (Debye-Scherrer optical system using an imaging plate; hereinafter referred to as BL19 diffraction equipment) in the large-scale synchrotron radiation facility, SPring 8 is used. Phosphor powder is packed tightly into a Lindemann glass capillary with an internal diameter of 200 μm. The incident X-ray wavelength is set to approximately 0.774 Å using a monochromator. While a sample is rotated with a goniometer, the diffraction intensity is recorded on the imaging plate. The measuring time is to be determined, paying attention to keep the imaging plate unsaturated. The measuring time is, for example, 5 minutes. The imaging plate is developed and an X-ray diffraction spectrum thereon is read out.

It should be noted that an error from the zero point when the data is read out from the developed imaging plate is approximately 0.03 in terms of diffraction angle 2θ.

An accurate incident X-ray wavelength is confirmed using a $CeO_2$ powder (SRM No. 674a) of NIST (National Institute of Standards and Technology) whose lattice constant is 5.4111 Å. The data measured on the $CeO_2$ powder is subjected to Rietveld analysis while varying only the lattice constant (a-axis length). The actual X-ray wavelength λ is calculated based on the difference between the value a' obtained for the predetermined X-ray wavelength λ' and the actual value (a=5.4111 Å) from the following formula.

$$\lambda = a\lambda'/a'$$

For the Rietveld analysis, RIETAN-2000 program (Rev. 2.3.9 or later; hereinafter referred to as RIETAN) is used (see NAKAI Izumi, IZUMI Fujio, "Funmatsu X-sen kaiseki-no-jissai—Rietveld hou nyumon" (Practice of powder X-ray analysis—introduction to Rietveld method), Discussion Group of X-Ray Analysis, the Japan Society for Analytical Chemistry, Asakura Publishing, 2002, and http://homepage.mac.com/fujioizumi/).

It should be noted that X-ray diffraction is a phenomenon that is observed when a crystal lattice, incidence of X-ray, and a geometry of diffraction satisfy the Bragg's condition:

$$2d \sin \theta = n\lambda.$$

Though the spectrum can be observed using a commonly available X-ray diffractometer, the diffraction profile observed has some differences because the observed strength depends on the incident X-ray wavelength.

<Manufacturing Method of Phosphor>

Hereinafter, the method of manufacturing the phosphor of the present invention will be described. The method of manufacturing the phosphor of the present invention is not limited to the method described below.

As an aluminum source material, an aluminum compound that is converted into alumina by firing, such as aluminum hydroxide, aluminum nitrate, and aluminum halide, each having high purity (purity of 99% or more), may be used. Alumina having high purity (purity of 99.9% or more) also may be used.

For a yttrium source material, a gallium source material, and a cerium source material, various source materials that can be converted into oxides may be used in the same way.

It is preferable that a small amount of a fluoride, such as aluminum fluoride, be added thereto to accelerate the reaction.

The phosphor is manufactured by mixing the above source materials and firing the mixed powder. The method of mixing the source materials may be wet mixing in a solution or dry mixing of dry powders. A ball mill, a stirred media mill, a planetary mill, a vibration mill, a jet mill, a V-type mixer, an agitator, and the like, which are in general industrial use, may be used.

The mixed powder is fired first in air at a temperature of 1100 to 1600° C. for about 1 to 50 hours. Further, it is fired in a weakly reducing atmosphere, such as a nitrogen gas containing 0.1 to 10 vol % of hydrogen, at a temperature of 1100 to 1600° C. for about 1 to 50 hours. In this way, the mixed powder is fired taking two steps under different atmospheres, thereby allowing a phosphor satisfying the above characteristics relating to the X-ray diffraction pattern to be obtained efficiently.

As a furnace to be used for the firing, furnaces that are in general industrial use may be used. A gas furnace or an electric furnace of the batch type or continuous type such as a pusher furnace may be used.

The particle size distribution and flowability of the phosphor powder can be adjusted by crushing the obtained phosphor powder again using a ball mill, a jet mill, or the like, and further by washing or classifying it, if necessary.

<Use of Phosphor>

The phosphor of the present invention has high luminance and color purity. Therefore, a light emitting device with high efficiency can be constructed by applying the phosphor of the present invention to the light emitting device that has a phosphor layer. Specifically, for a light-emitting device having a phosphor layer in which a conventional green phosphor, such as $Y_3Al_5O_{12}$:Ce, is used, the green phosphor, such as $Y_3Al_5O_{12}$:Ce, is replaced with the phosphor of the present invention, while a light-emitting device may be constructed according to a known method. Examples of the light emitting device include a PDP, a fluorescent panel, and a fluorescent lamp (e.g., mercury free fluorescent lamp). Among them, a PDP is suitable.

Hereinafter, an embodiment (the PDP of the present invention) in which the phosphor of the present invention is applied to a PDP will be described with an example of an AC surface-discharge type PDP. FIG. 1 is a cross-sectional perspective view showing the basic structure of an AC surface-discharge type PDP 10. It should be noted that the PDP shown here is illustrated for convenience with a size that is appropriate for a specification of 1024×768 pixels, which is the 42-inch class, and the present invention may be applied to other sizes and specifications as well.

As illustrated in FIG. 1, this PDP 10 includes a front panel 20 and a back panel 26, and these panels are arranged with their main surfaces facing each other.

The front panel 20 includes a front panel glass 21 as a front substrate, strip-shaped display electrodes (X-electrode 23, Y-electrode 22) provided on one main surface of the front panel glass 21, a front-side dielectric layer 24 having a thickness of approximately 30 μm covering the display electrodes, and a protective layer 25 having a thickness of approximately 1.0 μm provided on the front-side dielectric layer 24.

The above display electrode includes a strip-shaped transparent electrode 220 (230) having a thickness of 0.1 μm and a width of 150 μm, and a bus line 221 (231) having a thickness of 7 μm and a width of 95 μm and laid on the transparent electrode. A plurality of pairs of the display electrodes are disposed in the y-axis direction, where the x-axis direction is a longitudinal direction.

The display electrodes (X-electrode 23, Y-electrode 22) of each pair are connected electrically to a panel drive circuit (not shown) respectively in the vicinity of the ends of the width direction (y-axis direction) of the front panel glass 21. It should be noted that the Y-electrodes 22 are connected collectively to the panel drive circuit and the X-electrodes 23 each are connected independently to the panel drive circuit. When the Y-electrodes 22 and the certain X-electrodes 23 are fed using the panel drive circuit, a surface discharge (sustained discharge) is generated in the gap (approximately 80 μm) between the X-electrode 23 and the Y-electrode 22. The X-electrode 23 also can operate as a scan electrode, and in this case, a write discharge (address discharge) can be generated between the X-electrode 23 and an address electrode 28 to be described later.

The above-mentioned back panel 26 includes a back panel glass 27 as a back substrate, a plurality of address electrodes 28, a back-side dielectric layer 29, barrier ribs 30, and phosphor layers 31 to 33, each of which corresponds to one color of red (R), green (G), and blue (B). The phosphor layers 31 to 33 are provided so that they contact with the side walls of two adjacent barrier ribs 30 and with the back-side dielectric layer 29 between the adjacent barrier ribs 30, and repeatedly are disposed in sequence in the x-axis direction.

The green phosphor layer (G) contains the above green phosphor of the present invention. On the other hand, the red phosphor layer (R) and the blue phosphor layer (B) contain commonly-used phosphors. Examples of the red phosphor include $Y(P,V)O_4$:Eu and $Y_2O_3$:Eu, and examples of the blue phosphor include $BaMgAl_{10}O_{17}$:Eu.

Each phosphor layer can be formed by applying a phosphor ink in which phosphor particles are dissolved to the barrier ribs 30 and the back-side dielectric layer 29 by a known applying method such as a meniscus method and a line jet method, and drying and firing them (e.g., at 500° C., for 10 minutes). The above-mentioned phosphor ink can be prepared, for example, by mixing 30% by mass of a green phosphor having a volume average particle diameter of 2 μm, 4.5% by mass of ethyl cellulose with a weight average molecular weight of approximately 200,000, and 65.5% by mass of butyl carbitol acetate. In this regard, it is preferable that the viscosity thereof be adjusted eventually to approximately 2000 to 6000 cps (2 to 6 Pas), because the adherence of the ink to the barrier ribs 30 can be enhanced.

The address electrodes 28 are provided on the one main surface of the back panel glass 27. The back-side dielectric layer 29 is provided so as to cover the address electrodes 28. The barrier ribs 30 have a height of approximately 150 μm and a width of approximately 40 μm, and the longitudinal direction is in the y-axis direction. The barrier ribs 30 are provided on the back-side dielectric layer 29 so as to correspond to the pitch of the adjacent address electrodes 28.

Each of the address electrodes 28 has a thickness of 5 μm and a width of 60 μm. A plurality of address electrodes 28 are disposed in the x-axis direction, where the y-axis direction is a longitudinal direction. The address electrodes 28 are disposed at a certain pitch (approximately 150 μm). A plurality of address electrodes 28 each are connected independently to the above-mentioned panel drive circuit. Address discharge can be generated between a certain address electrode 28 and a certain X-electrode 23 by feeding each address electrode individually.

The front panel 20 and the back panel 26 are disposed so that the address electrode 28 and the display electrode are orthogonal to each other. The peripheral portions of both the panels 20 and 26 are bonded and sealed with a frit glass sealing portion (not shown) that serves as a sealing member.

An enclosed space between the front panel 20 and the back panel 26, which has been bonded and sealed with the frit glass sealing portion, is filled with a discharge gas composed of a rare gas such as He, Xe and Ne at a predetermined pressure (ordinarily approximately $6.7 \times 10^4$ to $1.0 \times 10^5$ Pa).

It should be noted that a space corresponding to a space between two adjacent barrier ribs 30 is a discharge space 34. A region where a pair of display electrodes intersect with one address electrode 28 with the discharge space 34 disposed therebetween corresponds to a cell used for displaying an image. It should be noted that in this embodiment, the cell pitch in the x-axis direction is set to approximately 300 μm and the cell pitch in the y-axis direction is set to approximately 675 μm.

When the PDP 10 is driven, an address discharge is generated by applying a pulse voltage to the certain address electrode 28 and the certain X-electrode 23 by the panel drive circuit, and after that, a sustained discharge is generated by applying a pulse between a pair of display electrodes (X-electrode 23, Y-electrode 22). The phosphors contained in the phosphor layers 31 to 33 are allowed to emit visible light using the ultraviolet ray with a short wavelength (a resonance line with a central wavelength of approximately 147 nm and a molecular beam with a central wavelength of 172 nm) thus generated. Thereby, a prescribed image can be displayed on the front panel side.

In accordance with a known method, the phosphor of the present invention can be applied to a fluorescent panel that is excited by an ultraviolet ray or visible light such as blue light and then emits light, and this fluorescent panel exhibits excellent luminescence efficiency compared to conventional fluorescent panels. This fluorescent panel can be used, for example, as a backlight of a liquid crystal display device.

The phosphor of the present invention can be applied also to a fluorescent lamp (e.g., electrodeless fluorescent lamp) in accordance with a known method. This fluorescent lamp exhibits excellent luminance efficiency compared to conventional fluorescent lamps.

EXAMPLES

Hereinafter, the present invention will be described in detail with reference to Examples and Comparative Examples. However, the present invention is not limited to these examples.

<Preparation of Phosphor Samples>

As starting material, $Y_2O_3$, $Al_2O_3$, $Ga_2O_3$, and $CeO_2$ were used. These were weighed to have a particular composition, and wet-mixed in pure water using a ball mill after 1 wt % of $AlF_3$ was further added thereto. With regard to sample Nos. 1 to 4, the mixture was dried and thereafter was fired in air at 1200 to 1500° C. for 4 hours, thereby allowing a phosphor to be obtained (firing condition A). With regard to sample No. 5, the mixture was dried and thereafter fired in a nitrogen gas containing 0.1 vol % of hydrogen at 1500° C. for 4 hours, thereby allowing a phosphor to be obtained (firing condition B). Meanwhile, with regard to sample Nos. 6 to 13, the mixture was dried and thereafter fired in air at 1200 to 1500° C. for 4 hours, and it was further fired in a nitrogen gas containing 0.1 vol % of hydrogen at 1200 to 1500° C. for 4 hours, thereby allowing a phosphor to be obtained (firing condition C). Table 1 shows the above-mentioned firing condition and composition ratio of each of the thus prepared phosphors. In Table 1, the samples marked with an asterisk are Comparative Examples.

The α-$Al_2O_3$ material (average particle size of 1 μm), which is commonly used, was used as $Al_2O_3$ material for the samples of Comparative Examples, whereas the θ-$Al_2O_3$ material (average particle size of 0.1 μm) was used as $Al_2O_3$ material for the samples of Examples.

<Powder X-ray Analysis Measurement>

Figure 2:
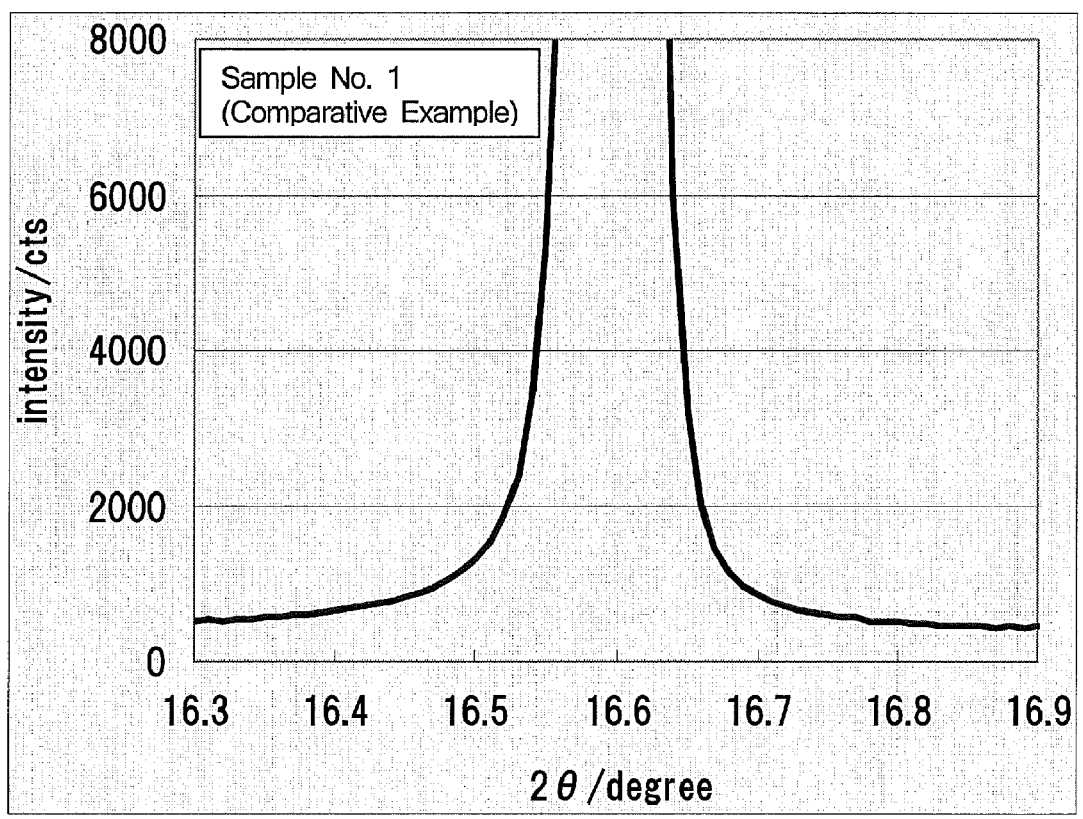
FIG. 2 shows a powder X-ray diffraction pattern of the phosphor sample No. 1 of Comparative Example in the present invention in the range of diffraction angle $2\theta=16.3$ to 16.9 degrees (vertical axis: diffraction intensity; and horizontal axis: diffraction angle $2\theta$ (degree)).
Figure 3:
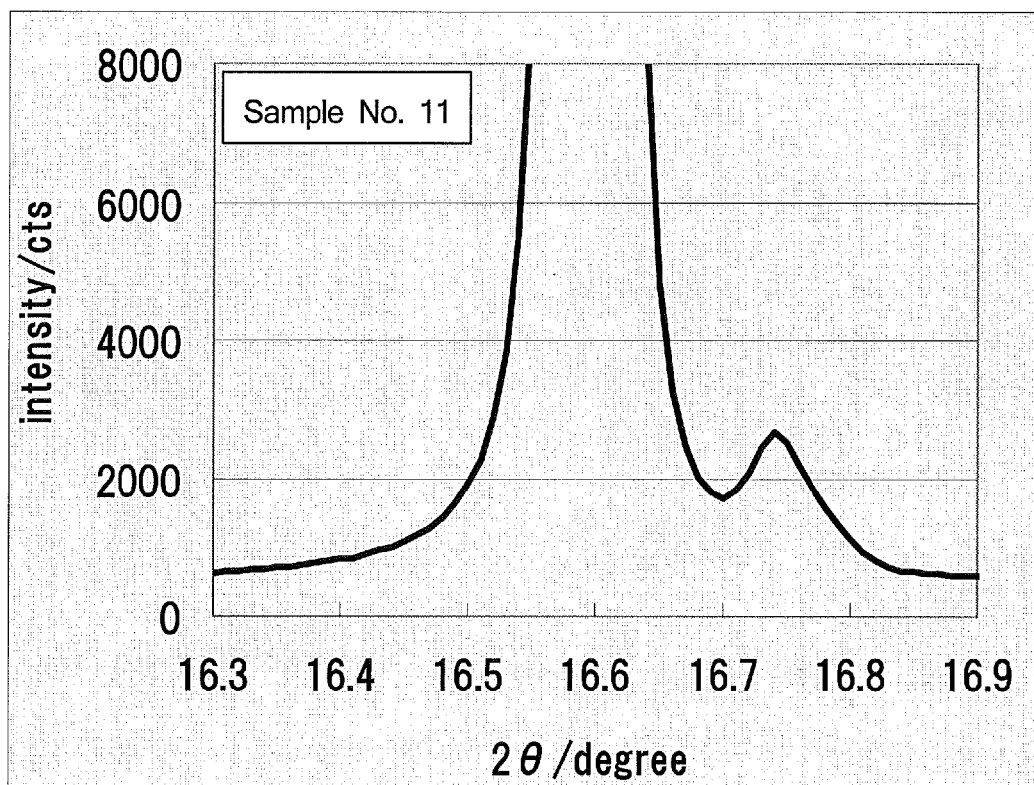
FIG. 3 shows a powder X-ray diffraction pattern of the phosphor sample No. 11 of Example in the present invention in the range of diffraction angle $2\theta=16.3$ to 16.9 degrees (vertical axis: diffraction intensity; and horizontal axis: diffraction angle $2\theta$ (degree)).

The X-ray diffraction patterns of the phosphor samples of Examples and Comparative Examples were measured by the above-mentioned method, using BL19 diffraction equipment in the large-scale synchrotron radiation facility, SPring 8. Table 1 shows the presence or absence of a peak whose peak top is located in the range of diffraction angle 2θ of not less than 16.7 degrees but not more than 16.9 degrees in the obtained X-ray diffraction pattern and the position of the peak. Further, FIG. 2 and FIG. 3 each show an example of the obtained X-ray diffraction pattern (sample Nos. 1 and 11).

<Measurement of Luminance and Color Purity>

The measurement of the luminance and color purity was carried out by irradiating the phosphor samples of Examples and Comparative Examples with a vacuum ultraviolet ray with a wavelength of 146 nm under vacuum and measuring the luminescence in the visible region. Table 1 shows the measured luminance (Y) and color purity (x, y). It should be noted that Y is the luminance Y in the XYZ color coordinate system of International Commission on Illumination, and expressed as a value relative to that of sample No. 1.

TABLE 1

| Sample No. | a | b | c | Firing condition | Peak position (degree) | Y (%) | x | y |
|---|---|---|---|---|---|---|---|---|
| *1 | 2.80 | 5.00 | 0 | A | Absent | 100 | 0.433 | 0.544 |
| *2 | 2.70 | 5.20 | 0 | A | Absent | 85 | 0.425 | 0.532 |
| *3 | 2.80 | 0.50 | 5.50 | A | Absent | 52 | 0.403 | 0.485 |
| *4 | 2.80 | 3.50 | 0 | A | Absent | 60 | 0.445 | 0.502 |
| *5 | 2.80 | 5.00 | 0 | B | Absent | 105 | 0.415 | 0.526 |
| 6 | 2.80 | 5.00 | 0 | C | 16.76 | 120 | 0.392 | 0.552 |
| 7 | 2.99 | 5.00 | 0 | C | 16.85 | 128 | 0.389 | 0.550 |
| 8 | 2.97 | 4.00 | 0 | C | 16.80 | 125 | 0.389 | 0.556 |
| 9 | 2.98 | 4.80 | 0 | C | 16.78 | 132 | 0.392 | 0.562 |
| 10 | 2.98 | 1.00 | 4.00 | C | 16.84 | 130 | 0.329 | 0.552 |
| 11 | 2.98 | 3.00 | 1.80 | C | 16.74 | 134 | 0.345 | 0.553 |
| 12 | 2.98 | 4.60 | 0.20 | C | 16.78 | 136 | 0.388 | 0.558 |
| 13 | 2.85 | 4.60 | 0 | C | 16.76 | 118 | 0.390 | 0.560 |
| 14 | 2.94 | 1.00 | 4.00 | C | 16.90 | 114 | 0.332 | 0.556 |
| 15 | 2.94 | 4.00 | 1.00 | C | 16.70 | 116 | 0.368 | 0.554 |

As is clear from Table 1, the phosphors each having a composition ratio in the composition range of the present invention in which a peak is present in the range of diffraction angle 2θ of not less than 16.7 degrees but not more than 16.9 degrees exhibit high luminance under vacuum ultraviolet excitation and have high color purity of green emission (the chromaticity value x is low and the chromaticity value y is high). Among them, the phosphors (sample Nos. 7 to 12) each having a composition ratio in the range of 2.97≦a≦2.99 exhibit particularly high luminance.

<Luminance and Color Purity of Panel>

PDPs having the structure of FIG. 1 were manufactured according to the above-described embodiment of an AC sur- face-discharge type PDP, using the green phosphors obtained in the same manner as in the phosphors of Samples Nos. 1 and 7 to 9. The initial luminance (value relative to that in the case of using sample No. 1) and color purity of each of the PDPs thus manufactured were measured. Table 2 shows the results. Each panel displayed a fixed image with one color of green. The samples marked with an asterisk in Table 2 are Comparative Examples.

TABLE 2

| Sample No. | a | b | c | Firing condition | Peak position (degree) | Panel characteristics | | |
|---|---|---|---|---|---|---|---|---|
| | | | | | | Luminance (%) | x | y |
| *16 | 2.80 | 5.00 | 0 | A | Absent | 100 | 0.442 | 0.540 |
| 17 | 2.99 | 5.00 | 0 | C | 16.85 | 132 | 0.382 | 0.556 |
| 18 | 2.97 | 4.00 | 0 | C | 16.80 | 129 | 0.385 | 0.560 |
| 19 | 2.98 | 4.80 | 0 | C | 16.78 | 135 | 0.390 | 0.568 |

As is clear from Table 2, it was confirmed that the panel using the phosphor of the present invention had high luminance and improved color purity.

Industrial Applicability

The use of the phosphor of the present invention makes it possible to provide a plasma display panel with high luminance, high color purity, and high efficiency. The phosphor of the present invention can be used for applications such as a fluorescent lamp (e.g., electrodeless fluorescent lamp) and a fluorescent panel.

The invention claimed is:

1. A phosphor represented by a general formula:

$aYO_{3/2}·(3-a)CeO_{3/2}·bAlO_{3/2}·cGaO_{3/2}$, where
2.80≦a≦2.99, 1.00≦b≦5.00, 0≦c≦4.00, and
4.00≦b+c≦5.00 are satisfied, wherein a peak whose peak top is located in the range of diffraction angle 2θ of not less than 16.7 degrees but not more than 16.9 degrees is present in an X-ray diffraction pattern obtained by measurement on the phosphor using an X-ray with a wavelength of 0.774 Å.

2. The phosphor according to claim 1, wherein 2.97<a<2.99 is satisfied.

3. A light emitting device comprising a phosphor layer that contains the phosphor according to claim 1.

4. The light emitting device according to claim 3, wherein the light emitting device is a plasma display panel.

5. The light-emitting device according to claim 4, wherein the plasma display panel comprises:
a front panel;
a back panel that is arranged to face the front panel;
barrier ribs that define a clearance between the front panel and the back panel;
a pair of electrodes that are disposed on the back panel or the front panel;
an external circuit that is connected to the electrodes;
a discharge gas that is present at least between the electrodes and contains xenon that generates a vacuum ultraviolet ray by applying a voltage between the electrodes through the external circuit; and
phosphor layers that emit visible light induced by the vacuum ultraviolet ray,
the phosphor layers include a green phosphor layer, and the green phosphor layer contains the phosphor.

* * * * *